3,330,877
PROCESS FOR THE CHLORINATION OF UNSATURATED HYDROCARBONS AND UNSATURATED CHLOROHYDROCARBONS

Charles E. Kircher, Detroit, Robert J. Jones, Dearborn, and Frank V. Kinsella, Detroit, Mich., assignors to Detrex Chemical Industries, Inc., Detroit, Mich., a corporation of Michigan
No Drawing. Filed June 4, 1963, Ser. No. 285,221
5 Claims. (Cl. 260—660)

This invention relates to an improved process for the production of chlorinated hydrocarbons. More particularly it relates to a process for the relatively low temperature (0° C.–150° C.) addition of chlorine to unsaturated hydrocarbons and unsaturated chlorohydrocarbons.

Processes for the direct chlorination of unsaturated hydrocarbons and unsaturated chlorohydrocarbons are well known. Such processes can be generally divided into two broad classifications: (1) those processes which require operating temperatures above 200° C. and (2) those processes which require operating temperatures below 200° C. Among the unsaturated compounds which are effectively chlorinated by these processes are acetylene, ethylene, propylene, dichlorethylene, trichlorethylene, and chlorinated propylene. Because of the nature of the reactant in such a process, former developments have included the use of specific reaction catalysts, purely vapor phase reaction, purely liquid phase reaction, mixed vapor and liquid phase reaction, specific reactor design and construction materials, limiting amounts of impurities in process feed streams, critical temperature conditions for controlling the process reaction. For example, the reaction between chlorine and acetylene, is presently conducted with the chlorine feed stream having a relatively high purity, since the introduction of air with such stream has resulted in the formation of explosive compositions in the presence of acetylene. Explosion hazards are favored also by the use of high temperatures. Obviously, the economics of the process utilizing a high purity feed stream of materials such as chlorine, are critical.

It is therefore an object of this invention to provide a direct chlorination process for the addition chlorination of unsaturated hydrocarbons and unsaturated chlorinated hydrocarbons at temperatures below about 200 C.

It is another object of this invention to provide such a process which involves the use of a chlorine gas feed which may contain impurities such as oxygen, hydrogen, hydrogen chloride and nitrogen in percentages heretofore thought to be inoperable and potentially hazardous.

It is another object of this invention to provide such a process which may utilize either a gaseous or a liquid unsaturated hydrocarbon or unsaturated chlorohydrocarbon feed stream.

It is another object of this invention to provide such a process which is capable of accommodating a variety of unsaturated hydrocarbon reactants (either as relatively pure compounds or as mixtures of compounds) in both the gaseous and liquid form.

It is another object of this invention to provide such a process which results in the production of a liquid product at the temperature of operation.

It is another object of this invention to provide such a process which is designed to operate in the pressure range of from zero pressure to a pressure of about 30 p.s.i.g.

It is another object of this invention to provide such a process which is continuous.

Other objects of this invention and certain advantages inherent therein will become apparent from a reading of the following description and claims.

Broadly, the improved process of this invention comprises the reaction of gaseous chlorine with unsaturated hydrocarbons and unsaturated chlorohydrocarbons in the presence of metallic iron, or in the presence of dissolved ferric chloride as a catalyst. The process is cyclical and requires the utilization of two process reactors connected in a continuous circuit. In carrying out the process of this invention, the liquid chlorinated product thereof or an inert solvent is continuously circulated through the process circuit including a first reactor and a second reactor. Each reactor is a packed tower, and preferably a tower filled with packing offering a minimum of vapor discontinuity. In certain cases, such as for example the chlorination of acetylene, it is necessary to avoid gas pockets within the packing where flammable mixtures might accumulate. The circulating liquid is introduced at the top of each reactor, and the normal flow thereof is from top to bottom in each reactor and from the bottom of the first reactor into the top of the second reactor. Initially, the gaseous chlorine is introduced at the bottom of the first reactor, whereupon the percolation thereof through the first reactor upwardly results in the solution thereof in the circulating liquid stream and the completion of certain reactions as hereinafter described. A vent is provided at the top of this first reactor, whereby accumulations of gases may be removed under controlled conditions. The unsaturated hydrocarbon or chlorinated hydrocarbon is introduced into the second reactor. Where this reactant is initially in the gaseous state, it is preferably introduced at the bottom of the second reactor, and where this reactant is initially liquid it is preferably introduced at the top of the second reactor. The principal chlorination reactions will take place in the second reactor, and this reactor is likewise provided with a vent at the top thereof, which may include a condenser to return condensible products to the process. A portion of the bottoms stream from the second reactor is continuously drawn off and separately processed by such treatments as distillation and the like to recover the desired finished product. The remainder of the bottoms from the second reactor is recycled through the continuous circuit to the top of the first reactor. In this manner any unreacted unsaturated materials are chlorinated at a lower concentration in the first reactor. The circuit between the bottom of the second reactor and the top of the first reactor may be utilized for the inclusion of conventional process equipment such as holdup tanks, flow control apparatus, and heat exchange apparatus.

It is significant that the process of this invention is designed to operate at high liquid flow rates. For example, liquid to gas mass flow rates on the order of 400 to 1 in the case of the chlorination of acetylene may be maintained. This order of flow rate is far above recognized practice for gas-liquid contacting apparatus. The temperature control of the reactors utilized in the process of this invention is accomplished by removing the exothermic heat of reaction as sensible heat in the circulating liquid stream. This sensible heat is in turn given up to cooling mediums in the conventional heat exchangers above described. Preferably, therefore the reactions accompanying the process of this invention are conducted essentially under adiabatic conditions. The preferred operation of the process of this invention is that conducted in a fully thermally insulated system, which favors a completely adiabatic process. When utilizing a solid iron catalyst, it may be placed in the reactors as part of the packing material, or it may be contained in a tank connected into the recycling circuit.

A primary advantage of the process of this invention is the ability to carry out potentially dangerous reactions such as the chlorination of acetylene with relatively safe operating conditions. Additionally, the ability to use an impure chlorine feed safely and efficiently is highly desirable. Additionally, the process of this invention leads to the conversion of raw materials on a level above 90% theory. Also, the producion of undesired byproducts is limited to less than about 10% of the total product.

The following examples will more clearly show the operation of the process of this invention.

*Example 1.*—A first reactor was constructed by erecting in vertical alignment two 3-foot sections of 3-inch diameter glass pipe separated by one foot long stainless steel section through which various connections could be made. A second one foot stainless steel section was provided at the bottom of the aligned glass sections, giving a total column height of 8 feet. The complete first reactor was packed with ¼-inch ceramic saddles. A second reactor was constructed of 5 feet of 4-inch diameter iron pipe filled with ⅜-inch ceramic packing. This reactor was mounted adjacent to the 8-foot column. The bottom of the 5-foot column was connected through a valved outlet to a pump, the outlet of the pump being connected to a tank having iron Raschig rings therein, and the outlet of the tank being connected to the top of the 8-foot reactor. Also connected into the top of the 8-foot reactor was a water cooled condenser having a vent for non-condensibles, as well as nitrogen purge line. A product take-off was provided at the bottom of the 8 foot reactor, and a bottom feed pipe was provided for the introduction of acetylene gas. The bottom of the 8-foot reactor was connected to a pump which in turn was connected into a holdup tank, which tank was connected through a rotameter into a heat exchanger designed to accommodate steam or water as heat exchange medium, the outlet of the heat exchanger being connected into the top of the 5-foot reactor. The 5-foot reactor was provided with a top vent and a nitrogen purge line. This complete system was filled with symmetrical tetrachloroethane, and cycling begun by starting the pumps. Chlorine feed was provided directly from a production feed of chlorine gas and acetylene feed was provided from a production feed of acetylene gas. Upon the initial circulation of the symmertical tetrachloroethane, chlorine and acetylene were gradually introduced at controlled rates to the respective reactors. The acetylene feed rate was adjusted to provide a 20-mole per hour supply to the 3-inch diameter reactor. A chlorine feed containing 40 moles per hour of chlorine, 10 moles per hour of air, and 0.25 mole per hour of hydrogen was provided to the 4-inch diameter reactor. The recycle rate was adjusted to 0.80 gallon per minute of the product leaving the bottom of the 3 inch reactor, and the temperature of the recycled material was maintained in a range of from 85° to 90° C. Based on analytical measurements of the reactor off gas, 97% of the chlorine and 96% of the acetylene were converted into products containing approximately 99% tetrachloroethane and 1% pentachloroethane. By operating in the above described manner it was possible to operate safely and continuously.

A series of runs was made utilizing the process described in Example 1 with feed chlorine having a variety of compositions. The following table indicates successive runs made with varying chlorine feed compositions, with the hours of continuous operation thereby being indicated.

| Dilution gases in Chlorine (vol. percent) | Hydrogen in Chlorine (vol. percent) | Hrs. of Cont. Operation |
|---|---|---|
| (Air) | 3% | 1% | 15 hrs. |
| Do | 3% | 1% | 24 hrs. |
| Do | 3% | 2% | 20 hrs. |
| Do | 8 to 15% | ½% | 22 hrs. |
| Do | 20% | ½% | 16 hrs. |
| (HCl) | 50% |  | 1.5 hrs. |

Compared to the safe operations indicated by the continuous runs just described, the presence of over 3% air in feed chlorine to the conventional tank type acetylene chlorinators will initiate violent burning with an accompanying explosion hazard. This is contrasted with a feed accommodating successfully as much as 20% air in accordance with the present process.

*Example 2.*—In comparable apparatus as that described in Example 1, the chlorination of ethylene to ethylene dichloride was conducted. The chlorine feed utilized contained 25% air by volume. The feed consisted of 1 mole per hour of ethylene (3.6 gm. mol/hr. in.$^2$), and 1.06 moles/hr. of chlorine. A liquid recycle of 134 cc./minute at a temperature in the range of from 50° C. to 60° C. was employed. On the basis of measured off gas the above conversion was determined at 98.1% of theory for ethylene and 99.4% of theory for chlorine, with 6% substitution products being formed.

*Example 3.*—Utilizing apparatus comparable to that described in Example 1 the continuous addition of chlorine to propylene was carried out. The feed rate was 1.00 gm. mol/hr. of propylene (3.6 gm. mol/hr. in.$^2$) and 1.06 gm. mol/hr. chlorine containing 25% air. Recycle consisted of 134 cc./minute of ethylene dichloride. A temperature of approximately 60° C. was maintained, with resultant chlorine conversion being 99.0%, and propylene conversion based on measured off gas at 98.2%. Approximately 7% of the chlorine reacted by substitution forming both 1, 1, 2 trichloroethane and 1, 2, 3 trichloropropane. Analyses of the product showed only 5% of the propylene converted to trichloropropane.

Among the advantages attendant to the process of this invention are excellent conversion of the process feed materials, increased tolerances for oxygen and hydrogen in the chlorine feed, effective reaction in the presence of hydrogen chloride impurity and relatively safe operating conditions.

Having thus described our invention, we claim:

1. A continuous process of conducting an addition reaction of chlorine gas with acetylene, said chlorine gas containing an impurity selected from the class consisting of air, oxygen and hydrogen, comprising the steps of
   (1) establishing a cyclic flow of the end product of the reaction between said chlorine gas and acetylene,
   (2) causing said end product to pass through a first reactor,
   (3) contacting said end product in said first reactor with a countercurrent stream of said chlorine gas, while venting said first reactor of accumulating gases, thereby dissolving said chlorine gas in said end product,
   (4) then causing said end product with dissolved chlorine to pass through a second reactor,
   (5) introducing acetylene into said second reactor,
   (6) contacting said end product with dissolved chlorine in said second reactor with said acetylene introduced therein whereby an addition reaction between said chlorine and said acetylene is initiated, while venting said second reactor of accumulating gases,
   (7) recycling the end product to said first reactor wherein said chlorination reaction is completed, thereby completing a flow cycle, and
   (8) presenting a plurality of ferrous metal surfaces to the flow of said recycled end product, while maintaining a temperature below about 200° C. during said process cycle.

2. The process in accordance with claim 1 wherein said impurity is oxygen.

3. The process in accordance with claim 1 wherein said impurity is hydrogen.

4. The process in accordance with claim 1 wherein the process temperature is maintained in the range of from 20° C. to 150° C.

5. The process in accordance with claim 1 wherein the process temperature is maintained in the range of from 60° C. to 120° C.

References Cited

UNITED STATES PATENTS

| | | | |
|---|---|---|---|
| 1,030,916 | 7/1912 | Ornstein | 260—660 |
| 2,022,616 | 11/1935 | Berliner | 260—660 |
| 2,374,933 | 5/1945 | Harding | 260—660 |
| 2,547,139 | 4/1951 | Randall | 260—660 |
| 2,746,999 | 5/1956 | Gunkler et al. | 260—660 |

LEON ZITVER, *Primary Examiner.*

K. V. ROCKEY, T. G. DILLAHUNTY,
*Assistant Examiners.*